(12) United States Patent
Haudenschild et al.

(10) Patent No.: US 8,386,442 B2
(45) Date of Patent: *Feb. 26, 2013

(54) SCALABLE COMPUTER ARRANGEMENT AND METHOD

(75) Inventors: Chris A. Haudenschild, La Jolla, CA (US); Senmao Lin, San Diego, CA (US); Yumin Chen, San Diego, CA (US)

(73) Assignee: CliniComp International, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/469,043

(22) Filed: May 10, 2012

(65) Prior Publication Data

US 2012/0246119 A1  Sep. 27, 2012

Related U.S. Application Data

(63) Continuation of application No. 13/342,887, filed on Jan. 3, 2012, and a continuation of application No. 12/902,800, filed on Oct. 12, 2010.

(51) Int. Cl.
  *G06F 17/30* (2006.01)
(52) U.S. Cl. ........................ 707/690; 707/694
(58) Field of Classification Search .................. 707/690, 707/694
  See application file for complete search history.

(56) References Cited

U.S. PATENT DOCUMENTS

| | | | |
|---|---|---|---|
| 5,829,006 A | 10/1998 | Parvathaneny et al. | |
| 5,848,415 A | 12/1998 | Guck | |
| 6,016,497 A | 1/2000 | Suver | |
| 6,021,405 A | 2/2000 | Celis et al. | |
| 6,119,126 A | 9/2000 | Yee et al. | |
| 6,223,227 B1 | 4/2001 | Williamson et al. | |
| 6,571,232 B1 | 5/2003 | Goldberg et al. | |
| 6,604,135 B1 | 8/2003 | Rogers et al. | |
| 6,732,094 B1 | 5/2004 | Cousins et al. | |
| 6,804,723 B1* | 10/2004 | Horikiri | 719/330 |
| 6,898,609 B2 | 5/2005 | Kerwin | |
| 7,200,602 B2 | 4/2007 | Jonas | |
| 7,509,280 B1 | 3/2009 | Haudenschild | |
| 7,644,066 B2 | 1/2010 | Krishnaprasad et al. | |
| 7,778,982 B2 | 8/2010 | Baker | |
| 7,949,545 B1 | 5/2011 | Madras | |
| 8,108,368 B2 | 1/2012 | Baker | |
| 2003/0105811 A1 | 6/2003 | Laborde et al. | |
| 2003/0187831 A1 | 10/2003 | Bestgen et al. | |
| 2003/0208493 A1 | 11/2003 | Hall et al. | |
| 2004/0024653 A1 | 2/2004 | Edgardo et al. | |
| 2005/0033743 A1 | 2/2005 | Robinson et al. | |
| 2005/0131901 A1 | 6/2005 | Richter | |
| 2006/0036656 A1 | 2/2006 | Mercer | |
| 2006/0064623 A1* | 3/2006 | Fischer et al. | 714/758 |
| 2006/0129559 A1 | 6/2006 | Sankaran et al. | |
| 2006/0173873 A1 | 8/2006 | Prompt et al. | |
| 2007/0271275 A1 | 11/2007 | Fassette et al. | |
| 2009/0019000 A1 | 1/2009 | Arends et al. | |
| 2009/0125882 A1* | 5/2009 | Frigo et al. | 717/116 |
| 2009/0129755 A1* | 5/2009 | Rakib et al. | 386/124 |
| 2009/0187344 A1 | 7/2009 | Brancaccio et al. | |

\* cited by examiner

*Primary Examiner* — Son T Hoang
(74) *Attorney, Agent, or Firm* — Bernard L. Kleinke; Duckor Spradling Metzger & Wynne

(57) ABSTRACT

A scalable computer arrangement and method enables the accessing of stored information by utilizing algorithms. The validity of the algorithms and/or retrieved data are determined by a validity management module. The algorithm and/or the retrieved data may be updated, whereby self correction occurs dynamically over time with changing stored information. In another embodiment, the computer arrangement and method enable networked computer systems each including hyper objects employing embedded algorithms or rules for accessing information across the network in a standardized manner, even though the networked computer system databases may employ different schema and formats.

20 Claims, 4 Drawing Sheets

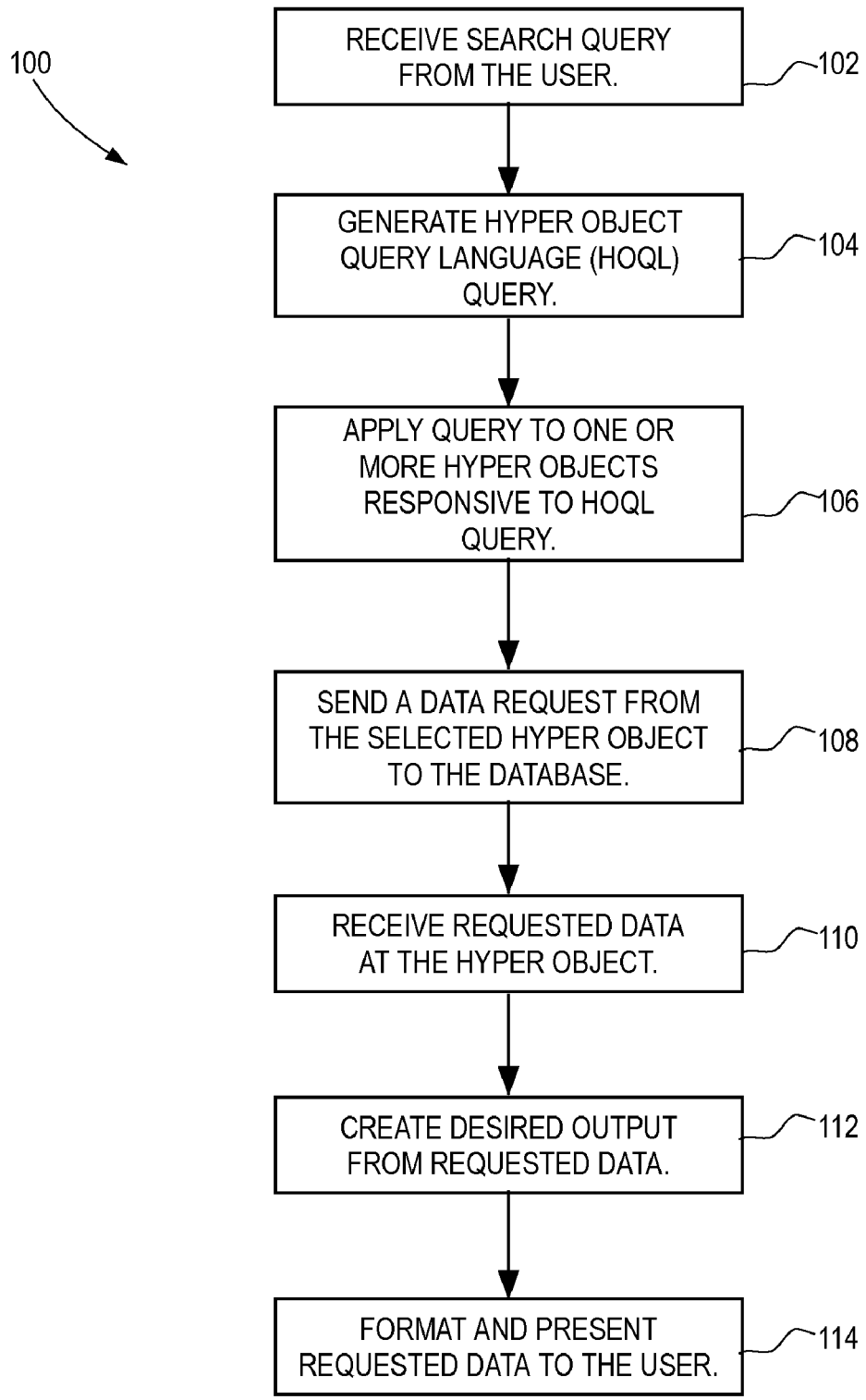

SCALABLE COMPUTER ARRANGEMENT AND METHOD

RELATED APPLICATION

This application claims priority to, and is a continuation of, U.S. non-provisional patent application, application Ser. No. 13/342,887, entitled SCALABLE COMPUTER ARRANGEMENT AND METHOD, filed on Jan. 3, 2012, of U.S. non-provisional patent application, application Ser. No. 12/902,800, entitled STANDARDIZED DATABASE ACCESS SYSTEM AND METHOD, filed on Oct. 12, 2010, and of PCT patent application, Application No. PCT/US2011/055649, STANDARDIZED DATABASE ACCESS SYSTEM AND METHOD, filed on Oct. 10, 2011, incorporated herein by reference in its entirety.

FIELD OF THE INVENTION

The present invention, in general, relates to a scalable computer arrangement and method which provide for dynamic self correction. More particularly, such an arrangement and method provide for access to stored information in a dynamically evolving manner.

BACKGROUND OF THE INVENTION

There is no admission that the background art disclosed in this section legally constitutes prior art.

There have been many different types and kinds of computer arrangements for managing and accessing stored information. For example, reference may be made to U.S. Pat. Nos. 5,829,006; 5,848,415; 6,016,497; 6,119,126; 6,223,227; 6,571,232; 6,898,609; 7,200,602; 7,509,280; 7,644,066; and 7,949,545; and U.S. patent application publications 2003/0105811; 2003/0208493; 2006/0173873; 2006/0036656; 2007/0271275; and 2009/0187344.

Computers have stored information for use in a variety of applications. For example, electronic databases have been known and used for many years. A given native database such as a given populated relational database may require modification, such as a change in the schema for the database. In so doing, it would be necessary to provide additional changes and modifications to the access method for the database to enable the same or similar reports or other outputs to be generated. The same would be true if the type of database structure were to be changed. In this regard, changes and modifications would also be required to maintain consistent reports and other output from the system.

It would be desirable to have a standardized database access arrangement, whereby standardized outputs, such as reports, can be generated by accessing distributed native databases even after the schema or the format of one or more of the databases may be modified or replaced.

One example of one type of electronic databases having different schema or requiring modifications in the existing schema, may be a healthcare management system for healthcare enterprises. Modernly, primary healthcare is often times provided by healthcare enterprises. A healthcare enterprise is a group of healthcare facilities including, for example, hospitals, laboratories, pharmacies, and others. Healthcare enterprises can be expansive, encompassing hundreds of doctors and many geographically widely dispersed point of care facilities. Alternatively, they can be more modest in size having just a few facilities.

Further, each facility may have computer systems that operate differently and store information in diverse formats and schema. Thus, information from different facilities of the same enterprise or of a different enterprise, may not be readily usable by another facility within the same enterprise or enterprises. For example, if a patient has been seen at two or more different facilities of an enterprise or of different enterprises, the medical number assigned to the patient may be different for each facility or enterprise.

A healthcare enterprise having multiple facilities may encounter several problems when admitting a patient. For example, it would be helpful to know whether or not the patient to be admitted is a current patient or had been previously admitted at any of the facilities of the same or different enterprise. Since each of the facilities may be using record management features incompatible with the other facilities, there is no efficient manner to find if a patient had been previously admitted to the same enterprise or to a different enterprise.

Confidently identifying all of the distributed records for a given to-be-admitted patient can be a daunting task. However, it is critical that the patient be positively associated with their true and complete medical record, if available. Such an identification task is exacerbated if the patient is unconscious. The person admitting the patient oftentimes must rely solely on antidotal information to establish the identity of the patient. Thus, the actual identity of the patient may not be established, or an incorrect identity made. Either way, providing treatment for the patient is difficult and may even result in harmful delays in the treatment for the patient.

In providing healthcare to a patient, it is highly desirable that a complete medical history be available to healthcare practitioners. However, in the modern healthcare environment, patients routinely are transferred to different facilities of the same or different enterprise. Thus, over a period of years a patient's medical record may become fragmented and dispersed among the various facilities of an enterprise, or even different enterprises.

Therefore, in general, it would be highly desirable to have a new computer arrangement for more efficiently and effectively communicating information. When the stored information changes or grows over time, it can be a challenge to continuously adapt the computer arrangement to the ever changing environment. Only one example of which is a system of distributed patient databases. Such a computer arrangement is ever changing. As patient data increases among a group of distributed databases, such as the databases associated with various facilities of a healthcare enterprise, or among various different and even unrelated healthcare enterprises, the complexity of managing the growing stored information continues to be an ongoing problem requiring attention.

The new computer system further should be able to quickly and efficiently be installed without burdensome expense to the enterprise that uses the computer system. When the computer arrangement is part of a computer network, for example, a new computer system joining the network should be able to preserve prior information technology investments and maintain its stored information with little or no modifications required.

In the example of a computer network, it would be desirable to have such a new computer network and method which could resolve non-compatible data information between network member computers, so that desired requested information such as given desired data files or records could be uniquely and confidently identified across the entire network, so that the desired information could be readily accessed across the computer network. As an example, but not by way of limitation, a clinical information system may contain clinical data about a patient organized by patient identification fields. The fields may not be unique or compatible across distributed hospital systems in the same or different enterprises. Thus, it would be important to have a unique identifier for every patient across the entire network of hospital systems.

One conventional technique for providing a network of computer systems employing databases is the "shadow" database arrangement. A shadow database is a separate database which stores the data of all the networked databases. In this manner, each member computer system has access to the data of all the networked databases by accessing the shadow database. However, all the databases must be synchronized with the shadow database. When inconsistencies are detected, then a resolution must be made in each separate database and in the shadow database. Also, whenever a new database is added to the network, the shadow database must be reconstructed to add a copy of the new database data. Also, each one of the existing network member databases usually require reconstruction, because all of the network databases and the shadow database must be synchronized.

Such requirements for a shadow database arrangement are time consuming, awkward and expensive. Maintaining the synchronism among the network databases is a continuous process of reconstruction as more and more data is being stored across the network. Also, such a network arrangement is limited to the number of databases that may be added. Every time a new database is added to the network, the complexity of maintaining the arrangement is multiplied and the shadow database continues to grow in size. When a new database is added to the network, the new database must be reconstructed to be compatible with the schema of the other network databases and the shadow database, so that any member computer system can access network data by accessing the shadow database. Thus, any new database can not be quickly and efficiently added to the network as the entire network is impacted including the shadow database.

It would be highly desirable to be able to add new databases to an existing network of databases in a fast and efficient manner. Also, it would be enormously beneficial to be able to expand the size of the network of databases substantially without limits in a convenient and cost effective manner. By so doing, any computer system database may be added to an ever expanding number of networked databases so that information may be exchanged readily and conveniently across the network.

Thus, it would be highly desirable to be able to exchange data between network member computer systems in a standardized manner, even where at least some of the databases have different schema. It would be desirable to have the ability to interchange information across databases, and still be able to communicate in a standardized manner. Additionally, such a computer network should be scalable to be able to add conveniently new legacy databases of new computer systems, or of new facilities, even though the new databases have different schema and even though some of the existing databases may have their schema revised or changed periodically.

All of this should be accomplished by having each computer system of the network being a stand alone computer. In this regard, there would be no need for centralized indexes or other centralized control operations for the network. A new computer system should be able to be added to the network in a stand alone manner and function almost immediately on the network, without restructuring its database. Also, any inconsistencies in the information being interchanged should be self-correcting and dynamically adaptable.

Such a computer arrangement and method should also be able to be self-correcting dynamically should incompatible information be retrieved from the distributed databases. Furthermore, such a computer network and method should be able to add a new computer system to the existing network and begin to function with the other networked computer systems almost immediately without any revisions to its formats or schema and without any revisions to the other networked computer systems. Each networked computer system could function in a stand alone manner and yet be able to access all of the databases across the entire network, even though there may be differences in the formats and schema among the various databases.

As to the more general aspects of the invention, the present invention is not in any way limited to clinical information systems, or even to networked computers. The present invention may be employed on a single stand alone computer which may be used for a variety of different applications and uses. Such variety of different applications and uses may include, but is not in any way limited to, financial applications, office applications, video games, system controls and a whole host of many other applications and uses. The computer arrangement and method of the present invention relates in general to an efficient and effective technique for adapting dynamically over time to continuously changing stored information requirements. The technique enables dynamic self corrections on the fly to be made as information requirements change with time. Thus, the novel technique is scalable and self correcting automatically over time.

BRIEF DESCRIPTION OF THE DRAWINGS

In order to better understand the invention and to see how the same may be carried out in practice, non-limiting preferred embodiments of the invention will now be described with reference to the accompanying drawings, in which:

FIG. 4 is a generalized flow chart of the computer arrangement of FIG. 3.

DETAILED DESCRIPTION OF CERTAIN EMBODIMENTS OF THE INVENTION

Figure 1:
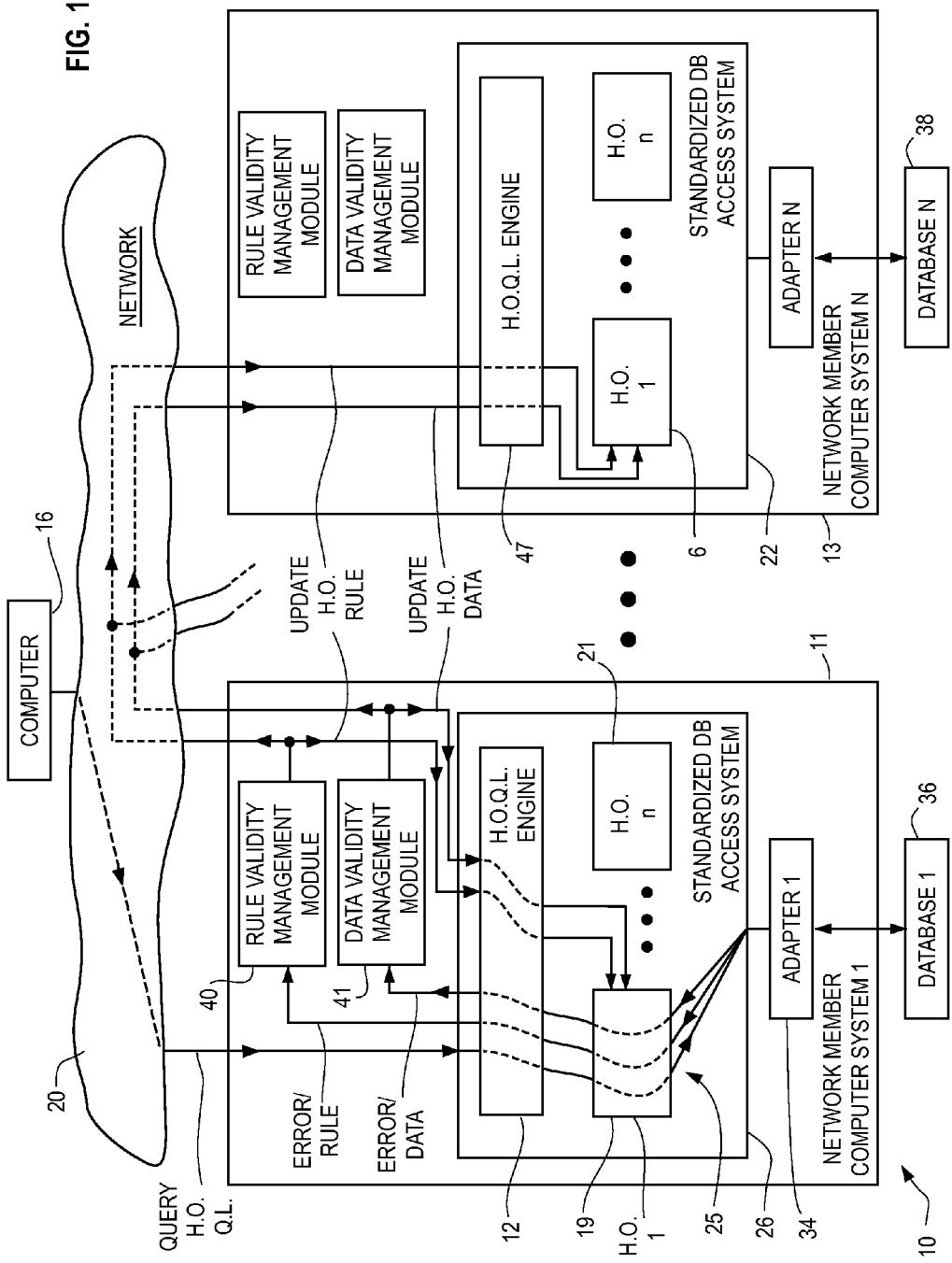
FIG. 1 is a generalized block diagram of a computer arrangement which is constructed in accordance with an embodiment of the present invention.

Certain embodiments of the present invention will now be described more fully hereinafter with reference to the accompanying drawings, in which some, but not all, embodiments of the invention are shown. Indeed, these embodiments of the invention may be in many different forms and thus the invention should not be construed as limited to the embodiments set forth herein; rather, these embodiments are provided as illustrative examples only so that this disclosure will satisfy applicable legal requirements. Like numbers refer to like elements throughout.

It will be readily understood that the components of the embodiments as generally described and illustrated in the drawings herein, could be arranged and designed in a wide variety of different configurations. Thus, the following more detailed description of the certain ones of the embodiments of the system, components and method of the present invention, as represented in the drawings, is not intended to limit the scope of the invention, as claimed, but is merely representative of the embodiment of the invention.

According to at least one embodiment of the present invention, a computer arrangement and method enables the accessing of certain stored information by utilizing at least one algorithm. The validity of retrieved data and/or the algorithm itself is determined by a validity management module. If the retrieved data and/or the algorithm is determined by the validity management module to be invalid, the algorithm and/or the retrieved data is updated, whereby self correction occur dynamically over time with changing stored information.

According to a further embodiment of the present invention, there is provided a computer arrangement and method for a scalable network of computers to interact with certain information stored in a group of networked databases. Each one of the networked computers uses a standardized database access system storing a group of stored standardized algorithms to enable data to be accessed in a standardized manner from all of the networked databases. The validity of the data provided by means of the algorithms in the standardized data access systems is determined by using at least one validity management module in each one of the computers. If the data provided by means of the algorithms is determined to be invalid by a validity management module in one of the computers, the algorithm providing the invalid data is updated, and/or the invalid data is updated, thereby correcting the invalidity. As a result, self correction occurs dynamically over time with changing stored information.

According to an embodiment of the present invention, a computer arrangement and method are employed for a scalable network of computer systems to interact with certain information stored in a group of network databases, at least some of which having different schema. Each one of the networked computer systems use a standardized database access system storing a group of standardized hyper objects, at least some of which include algorithms to enable data to be accessed in a standardized manner from any of the network databases. An algorithm embedded in one of the hyper objects of one of the computer systems can interact with the information stored in its database and alternatively with the information stored in the other databases across the network. The data can be accessed from the network databases across the network in a standardized manner.

According to a further embodiment of the present invention, the computer arrangement and method employs a validity management module to determine the validity of the algorithm and/or the data retrieved from the database. If either or both is determined by one of the validity management modules to be invalid, such one of the validity management modules provides update information for the algorithm or the retrieved data to thereafter cause the algorithm and/or the retrieved data to be valid. Thus, self corrections occur dynamically over time with changing stored information.

According to yet another embodiment of the present invention, the computer arrangement and method enables each one of the computer systems to operate in a stand alone manner. Each one of the computer systems can operate independently of the other network computer systems and alternatively can access data in a standardized manner across the network from any of the network databases.

According to a still further embodiment of the present invention, the computer arrangement and method enables connecting in communication additional computer systems to the existing scalable network of computer systems without requiring adjustments to the networked existing computer systems or the added computer systems and without requiring the added computers to be synchronized with the existing computer systems. Thus, the added computer systems are able to retain their own native schema and formats, and the added computer systems can, once added in communication with the existing network computer systems, function normally and provide self corrections only upon determining the existence of an invalid algorithm and/or retrieved data to enable the computer arrangement to be scalable.

A further embodiment of the present invention relates to the computer arrangement and method wherein in response to an invalid algorithm and/or retrieved data, update information is used locally in a given computer system as well as being sent to other network computer systems.

Another embodiment of the present invention relates to the computer arrangement and method wherein the algorithm and/or retrieved data are updated when an invalid algorithm and/or retrieved data is determined.

According to at least some of the embodiments of the present invention, a computer arrangement and method enable networked computer systems to determine if certain desired information retrieved from networked databases is invalid and can self correct dynamically by updating the retrieved data. The updates may be sent across corresponding algorithms of the networked computer systems, so that the desired information will be valid across the network.

According to other embodiments of the present invention, a computer arrangement and system may include networked computer systems employing hyper objects to enable standardized outputs such as reports and other information to be generated.

By utilizing the foregoing techniques, a readily scalable computer system network can be employed. New network member computer systems, even having databases with different database schema and/or formats, may be added to existing computer systems or removed from the computer network without disrupting the distributed network. When it is determined that certain algorithms and/or retrieved data is invalid, the algorithm and/or the retrieved data may be updated locally and across the entire database network. In this manner, the network system is readily and conveniently scalable.

According to at least some of the embodiments of the present invention, the database access computer network and method enable standardized outputs such as reports, displays and others to be produced, independently of the underlying database employed. In this manner, a native database can be utilized for producing desired standardized reports and other such output, independently of the schema or data structure of a given database. Also, the same standardized reports or other output can be readily created even though a new database is added to or an existing database is removed from the network, or even though a change is made in the schema and/or the database structure of an existing network database.

One embodiment of the present invention relates to a standardized technique for accessing data from a database. The technique may include providing a group of hyper objects each containing a different uniqueness algorithm or rule. A hyper object is similar to a conventional object, except that it does not contain or store data, only algorithms or rules for accessing data from a separate database. When a hyper object query language (HOQL) query is received using an HOQL engine, at least one hyper object is selected using the HOQL engine in response to the HOQL query. A data request is sent via the selected hyper object to retrieve data from the database. The requested data is used according to the algorithm or rule associated with the selected hyper object to provide a desired output.

Thus, according to certain embodiments of the present invention, the standardized database access computer network and method can be utilized for different native databases for creating standardized outputs in response to HOQL queries which are similar to familiar SQL queries, independently of changes to database formulation or schema.

The standardized database access system provides management function such as creating, storing, deleting or listing hyper objects. It also provides for data access functions of retrieving, storing and updating hyper objects. The hyper objects include both data objects and context objects. The context objects determine for the data hyper objects certain environment or configuration of the information requested responsive to a query.

The data accessed by the hyper object may be interpreted by the use of a context hyper object. The context hyper object may take into account time, location, and/or other, which may change the perspective of data accessed. For example, when an embodiment of the computer arrangement and method are used in the clinical environment, a normal drug dose may change dramatically for a neonate as compared to an adult, demonstrating the importance of the context of age.

The context hyper object could cause a context portion of an algorithm or rule of one or more data objects to be transformed accordingly to facilitate the search. Such an approach may be particularly useful where many native database/schema combinations are employed and standardized outputs are desired.

General Description

Figure 2:
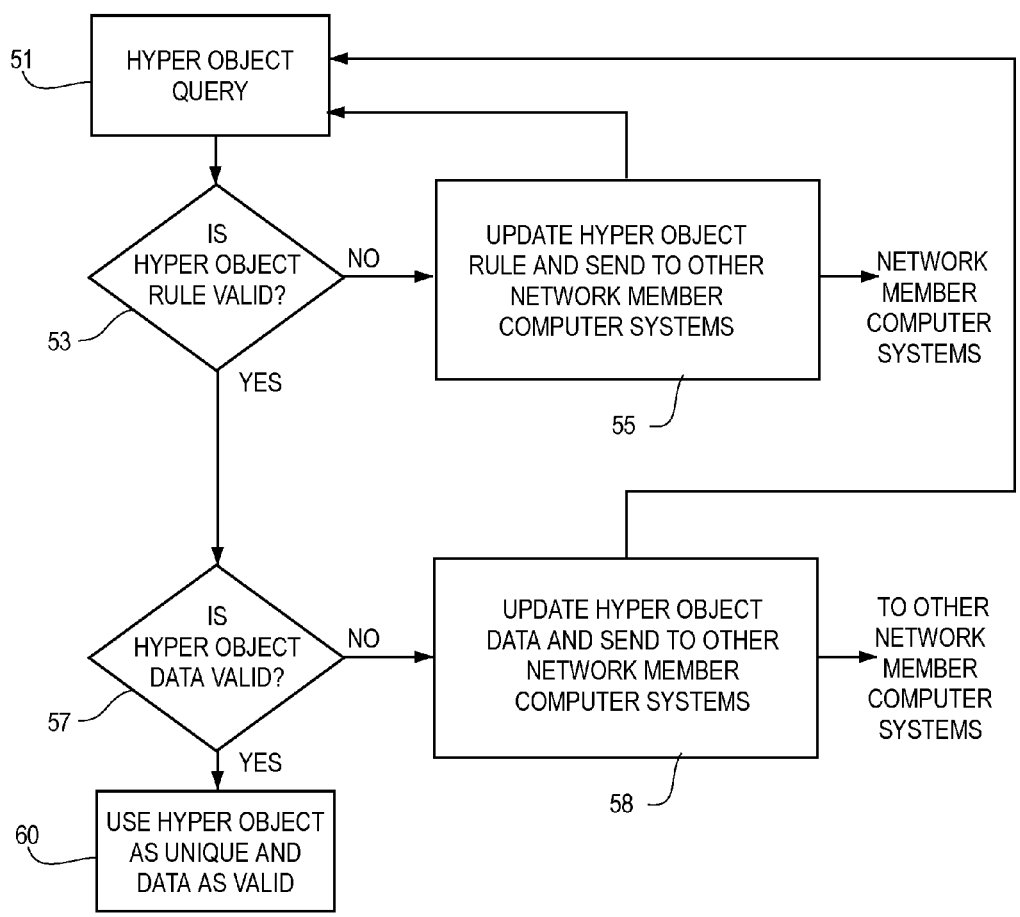
FIG. 2 is a flow chart of a method of operating the computer arrangement of FIG. 1.

Referring now to the drawings, and more particularly to FIGS. 1 and 2 thereof, there is shown an embodiment of the invention employed in a networked computer generally indicated at 10. The scalable computer arrangement 10 includes at least two similar distributed network member computer systems, such as the computer systems 11 and 13 which are generally similar to one another. It should be understood that the computer arrangement 10 may include many more networked computer systems (not shown). Also, it is important to note that a single computer system may also employ an embodiment of the present invention and function stand alone without being networked.

The system 10 may include a computer 16 for accessing distributed local native databases such as a native database 36, as well as accessing other network native databases such as a native database 38 of the network member computer system 13 via a network, such as the Internet network 20. It should be understood that other forms of communication between and among the network member computer systems may be employed in place of the Internet, and other wireless networks or other wired connections are contemplated.

The computer arrangement 10 enables new member computer systems to be added in a convenient manner to scale up the network. In this regard, a new network member computer system, such as the system 11 or the system 13, may be networked with the other network member computer systems without affecting the other members of the network. In this regard, new network member computer systems being added to the existing network are able to function normally almost immediately without interruption, as well as all the other members of the network 10. Similarly, existing computer systems can be removed from the network without disrupting it. The network 10 enables its member computer systems including a new member to communicate with one another and access information from all of the computer system databases to access data across the entire network in a standardized stand alone manner, even when a new member is added to, or an existing member is removed from, the network, and even though a new member is not required to change the format or schema of its database. Reports and other output being generated concerning the information retrieved from the network databases could have standardized formats. All of this is accomplished, even though at least some of the network databases have different formats and different schema.

The computer arrangement 10 is dynamically adaptable and self-correcting. When invalid rules or algorithms and/or retrieved data is discovered, the computer arrangement 10 resolves the invalidity problem across the entire network automatically. The corrections may occur only when an invalidity is detected. Thus, a new member can be introduced to the network without requiring adjustments such as to the format or schema of the data base to match others in the network. Also, existing computer systems can be removed without disrupting the network.

In general, when invalid database data and/or invalid algorithms or rules are discovered, it is also self-corrected as hereinafter described in greater detail. Once invalid retrieved data and/or an invalid algorithm or rule is discovered, the retrieved data and/or algorithm or rule is updated locally and each network computer system will receive the updates to its corresponding data and/or algorithm or rule. In this regard, each network computer system will receive update notification regarding an update, and then each computer system may make suitable changes to its algorithm or rule, or other update as each computer system deems necessary using the same method as described herein. This method enables the network to be maintained in synchronization and each computer system can continue to operate symmetrically and independently.

Since each network member computer system is generally similar to one another, only the network member computer system 11 will now be described in greater detail. Referring now to FIG. 1, each network member computer system such as the system 11 includes a standardized database access system (SDAS) such as the system 26. Similarly, the network member computer system 13 includes a standardized database access system 22 which is similar to the system 26.

As hereinafter described in greater detail, the standardized data access system such as the system 26 helps enable communication with the network databases such as the databases 36 and 38 in a standardized manner so that standardized reports, for example, can be accessed by a computer such as the computer 16 for the computer arrangement 10. Also, the standardized database access system such as the system 26 employs a hyper object library generally indicated at 25, as hereinafter described in greater detail, to facilitate undertaking the exchange of data in a standardized manner between and among the network member computer systems such as the systems 11 and 13. The library 25 includes a group of hyper objects each having embedded algorithms or rules, such as the hyper objects 19 and 21 which may be used to, amongst other things, retrieve unique data from the database 36 as well as from the other networked databases such as the database 38. Each corresponding one of the other network member computer systems includes a similar group of hyper objects each having corresponding algorithms, to enable unique data to be communicated across the entire network. For example, and not by way of limitation, if the network member computer system 11 is a hospital system, patient management tools may apply to all network member computer systems across the network. Decision support tools may be applied to a selected patient population (for example, all patients with diabetes). From this population, rules-based criteria for management/monitoring may be used via similar algorithms as a common data exchanging protocol across all of the network member computer systems.

As mentioned previously, in the computer network embodiment of the computer arrangement 10 of the present invention, network member computer systems may be added or subtracted from the computer network without affecting the integrity of the overall databases or capabilities associated with the embodiment of the inventive computer arrangement and method. The use of distributed corresponding algorithms and the self-correcting adaptable capabilities, as hereinafter described in greater detail, enable the computer arrangement 10 to be readily scalable and many functions are possible and contemplated in accordance with the present invention.

The network member computer system 11 includes a rule validity management module 40 which monitors data received from the local native database 36 via the hyper objects such as the hyper object 12. If the module 40 determines the embedded algorithm or rule to be invalid, then the module 40 provides an update hyper object rule signal to the local hyper object 12 and other corresponding hyper objects of the other network member computer systems such as the hyper object 6, for updating the rule in the corresponding hyper objects.

Similarly, a data validity management module 41 detects invalid data retrieved from a database by hyper objects such as the hyper object 12, and then generates an update hyper object signal for updating the data retrieved from the networked databases.

In general, when an algorithm and/or data update is generated then every computer system across the network may receive the update signals so that all other networked computer systems and their databases may be updated as well.

The computer arrangement 10 as illustrated in FIG. 1 shows an example of how the arrangement 10 self-corrects and operates in a standardized manner across the network, which will now be described in greater detail. Each standardized database access system such as the system 26 includes a hyper object query language engine such as the engine 12 for communicating with the hyper object library 25 of hyper objects. Hyper objects of the library 25 may be utilized to communicate queries via an adapter 34 to a native database 36. In this manner, data may be retrieved from the database 36 via the adapter 34 through the hyper object library 25 and the engine 12 to other network computer systems via the network 20.

The hyper objects may each contain an algorithm or rule for facilitating amongst other things, retrieving information from the native database 36. For example, and not by way of limitation, if the arrangement 10 is used in a clinical or hospital environment, a patient identifier may be directed to a particular patient. Therefore, certain attributes for the patient may be used as the identifier. One example may be a group of information such as the name of the patient, and the birth place of the patient. As hereinafter described in greater detail, should the algorithm such as the patient identification algorithm or rule of a hyper object such as the hyper object 19 be determined to be invalid, the algorithm may then be updated automatically.

Referring now to FIG. 1, considering now an example of how the computer arrangement 10 self corrects dynamically invalid algorithms and/or retrieved data. Assume that the computer 16, sends a request regarding new database information via the network 20 to the network member computer system 11. The request is sent to the hyper object engine 12 which in turn provides the request for a hyper object such as the hyper object 19. The hyper object 19 then retrieves data via the adapter 34 from the native database 36. The validity management modules 40 and 41 determine whether or not the algorithm and/or retrieved data is valid or not. If the algorithm and/or retrieved data is determined to be invalid, then the algorithm and/or retrieved data is updated along with corresponding algorithms and/or data for the other networked computer systems.

By this updating of algorithms/data across the entire computer arrangement 10, algorithm and retrieved data invalidities are self correcting dynamically across the network over time. Also, in this manner, a new computer system can be added to the networked computer arrangement 10 without extensive delays and can function on the network 10 almost immediately. Each computer system operates in a stand alone manner in a networked embodiment of the computer arrangement 10, and is self correcting dynamically over time. For this reason, other non-networked embodiments of the present invention are contemplated, since the computer arrangement and method of the present invention enables computer algorithms and/or retrieved data to be dynamically corrected over time.

Computer Arrangement Operation

Referring now to FIG. 2 of the drawings, a generalized system operation will now be described. As indicated at box 51, a given desired stored information may be retrieved from the databases of the computer arrangement 10, such as by using, for example, the hyper object 19 retrieves data from database 36.

At box 53, the rule validity management module 40 in response to receiving an ERROR/RULE message (indicating that the hyper object rule is to be checked for possible errors) from the hyper object 19 of the standardized database access system 26 via the hyper object query language engine 12, determines if the hyper object algorithm or rule is valid. If it is not valid, then the rule validity management module 40 updates the hyper object rule for the hyper object 19 by sending an UPDATE HYPER OBJECT DATA signal to the hyper object 19. That same signal is also sent to all of the other network member computer systems for updating the corresponding other algorithms or rules of the corresponding hyper objects such as the hyper objects 6 of the network member computer system 13, as indicated at box 55. After updating the hyper object rule, the process continues at box 51 to again allow the rule validity management module 40 to determine if the data provided by the hyper object 19 is valid.

Assuming that the rule is functioning satisfactorily, the data validity management module 41 determines if the retrieved data itself is valid. In this regard, if the rule is valid, the retrieved data itself may not be valid and thus require updating or otherwise be corrected. If the retrieved data is not valid, the data validity management module 41 as indicated in box 58 in response to an ERROR/DATA signal (indicating that the hyper object data is to be checked for possible errors), updates the retrieved data by providing a signal UPDATE HYPER OBJECT DATA to the other network member computers. This signal is supplied to the hyper object 19 via the hyper object query language engine 12, as well as to all of the other corresponding hyper objects such as the hyper object 6. In this manner, the updated data may then be stored in the networked databases.

As indicated at box 51, the query is repeated to enable the validity management modules 40 and 41 to determine if the rule and the retrieved data are valid. If so, as indicated at box 60, the hyper object is then used as being unique and retrieving valid data. When the update information is forwarded to the other network member computer systems, both data and its context may be included.

As a simplistic example of a hyper object rule invalidity, assume that the algorithm requires a single attribute, a person's name to determine a person's identification. Suppose that the algorithm executes and retrieves two records, both of them for a person by the name of Bob Jones. However, the two records indicate that each Bob Jones has a different date of birth. One Bob Jones is age 10, and the other Bob Jones is age 50. The rule validity management module 40 would then determine that these are two different people by comparing the ages. Thus, the data retrieved by the algorithm is valid data, but the algorithm is now incapable of always identifying a unique desired data. Accordingly, the rule validity management module 40 would determine the algorithm to be an invalid algorithm. The embodiment of the computer arrangement and method of the present invention in this situation may then cause the algorithm in this example to be updated dynamically by changing the algorithm or rule by adding one or more attributes such as the attribute of requesting the date of birth so that both the name and the date of birth are used to identify a person. In this manner, the algorithm or rule would be able to uniquely identify the desired person.

In a similar manner, as other ambiguities appear, additional attributes may be added to resolve other ambiguities on an ongoing basis dynamically. For example, and not by way of limitation, a person's physical characteristics such as fingerprints, eye colors, gender and/or other physical characteristics of the person identifier may be added to the other attributes for uniquely identifying persons. Once the updated algorithm is determined to be valid or not found to be invalid by the computer arrangement 10, the computer system is able to be dynamically self corrective over time. In this regard, the module 40 may cause the network member computer system 11 to be updated locally by sending an update hyper object rule to the appropriate hyper object of the hyper object library 25, and cause the other network member computer systems to be updated similarly by sending the update hyper object rule across the entire network, as indicated in FIG. 1.

Considering now an example of invalid retrieved data. A person identifier in the form of a personal identifier field is created to identify a certain person's records. Assume a simple rule by which data is assigned to the personal identifier field. The rule states that for every personal identifier field there can be only one person's name associated with it in that record. Likewise, for every person's name there can only be one personal identifier field associated with it. As a result, assume a request is made of all records for a given personal identifier field as the search key and the query returns more than one name associated with the personal identifier field. The data validity management module 41 may then determine that the personal identifier field data is proven to be not unique since records are retrieved with more than one name. The module 41 then may decide which or all of the data of the personal identifier field to correct and then make the needed correction to the data based on an algorithm which will satisfy the rule. It should be noted that the retrieved data is determined to be invalid, because it was found to be inconsistent with the rule. Thus the embodiment of the computer arrangement and method updates locally the stored data by correcting, in this example, the personal identifier field data for one or more of the inconsistent records and thereafter sends update hyper object data to the local system 11 and to the other network member computer systems so they may all be updated accordingly, as indicated in FIG. 1. In a second example, assume a request is made of all records for a given person's name as the key and the query returns more than one associated personal identifier field. The data validity management module 41 may then determine that the personal identifier field data is proven to be invalid since records are retrieved with more than one personal identifier field data for the same name. The module 41 then may decide which or all of the data of the personal identifier field data to correct and then make the needed correction, based on an algorithm which will satisfy the rule previously stated. Thereafter the data validity management module 41 sends update hyper object data to the local system 11 and to the other network member computer systems so they may all be updated accordingly, as indicated in FIG. 1.

It should be noted by way of clarification that patient identification algorithms such as the one disclosed in U.S. Pat. No. 7,509,280 assigned to the same assignee as this application and incorporated herein by reference, have been known. In the patented system, patient identifiers are stored in a master index for a hospital enterprise and the patented algorithm approach enabled each patient identifier to be unique for the patients having patient records stored in the enterprise computers. While such a technique has been highly successful, it does not address the present problem of bringing new computer systems having its legacy database, into communication with a computer network of other databases without having to do any initial adaptation of the data identifiers such as patient identifiers, before the new computer system can function online with the distributed databases of the various networked computer systems. In this regard, using the patented technique, where a single master index is employed for all of the hospitals of a hospital enterprise, the patient identifiers of a new data base being added to an existing network, must all, for at least some applications, be compared or otherwise reconstructed relative to the master index and then revised, if required, before the new database of a new computer system can be utilized in the distributed computer network. Furthermore, as explained hereinafter in greater detail, the system contemplated by the U.S. Pat. No. 7,509,280, would probably have to be reconstructed to have a new database data structure or schema implemented to match each and every data structure or schema of the other databases of the network to standardize the operation.

Whereas, the inventive computer arrangement and method employs standardized techniques which allow a new computer system to be readily introduced to the network in a convenient manner without requiring changes or modifications in the new system or in the other existing computer systems. Similarly, existing computer systems can be removed from the network without disrupting it. Each computer system operates stand-alone and can be introduced to the network and commence operations substantially immediately without unwanted and unnecessary revisions to its database structure.

In the embodiment of FIG. 1, the only customization which may be required, at least for some applications, before a new network member computer system and its associated database could function on line with the other networked computer systems and its database, would be to cause the adapter such as the adapter 34 to transform the data of the legacy database such as the database 36 for each hyper object of the hyper object library such as the library 25 of FIG. 1. It is presently contemplated that the initial hyper object library such as the library 25, may include one or more initial hyper objects when a new member computer system is being connected to the network. The initial hyper object or objects correspond to similar or like hyper objects in the other networked member computer systems. Thereafter, the new system including its database can function normally across the network, and any invalid data or invalid algorithms or rules, when they occur, may be corrected thereafter dynamically.

Unlike the shadow database arrangement which requires synchronization and rebuilding of the database systems when new databases are added to the network, with the arrangement of embodiments of the present invention, each computer system and its database functions in a standalone manner without requiring a cumbersome and awkward "shadow" database. Certain embodiments of the present invention enable new databases to be added to the network in a fast and efficient manner without making any adjustments or rebuilding the other network members. Also, the embodiments of the present invention enable the network to be scaled upwardly without limit in a convenient and cost effective manner.

Standardized Database Access System

Figure 3:
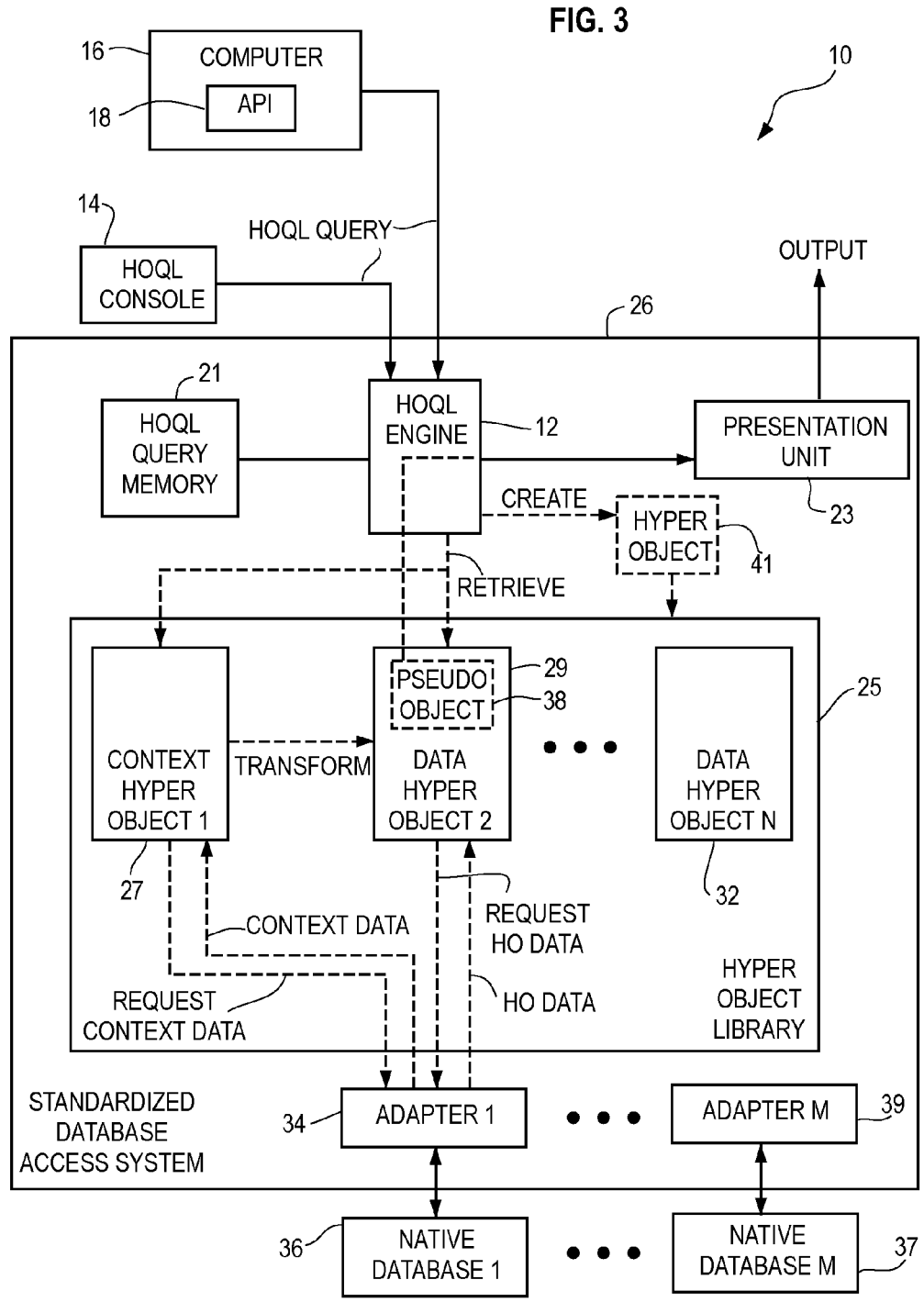
FIG. 3 is a more detailed block diagram of a hyper object database access system of a portion of the computer arrangement of FIG. 1.

Referring now to FIGS. 3 and 4 of the drawings, there is shown in greater detail the standardized database access system 26, which includes the hyper object query language (HOQL) engine 12 for receiving a HOQL query from either a HOQL console 14 or the access computer 16 utilizing an application programming interface (API) 18. The HOQL engine 12 may utilize the HOQL query memory 21 for storing the HOQL queries. The presentation unit 23 presents standardized output to the user in various forms such as printed reports, displays and others. The hyper object library 25 containing a group of hyper objects, such as hyper objects 27, 29, and 32, for responding to the HOQL queries. The hyper objects may then access and manipulate data requested and received from a group of native databases such as the native database 36 and a native database 37 associated with the network member computer system II of FIG. 1, via an adapter 34 and an adapter 39, respectively. The presentation unit 23 presents standardized outputs to the user in the various forms in response to the HOQL engine 12 as hereinafter described in greater detail.

The hyper objects may each include different rules for requesting access to data in the database and rules for manipulating the data received from the database. The hyper objects may not store data. Each one of the rules in the hyper objects may include functional manipulations, logical decisions, and context transformations.

The hyper object library 25 may include at least one context hyper object, such as a context hyper object 27, and a plurality of data hyper objects, such as data hyper objects 29 and 32. The context hyper object 27 may include rules that may be used to request context data and receive the requested context data from the database 36 via the adapter 34. The context data may include information regarding the context or environment specified in the search query. Upon receiving and manipulating the requested context data using its rules, the context hyper object 27 may then provide a transform command to one or more of the selected data hyper objects, such as data hyper object 29.

The data hyper object 29 may then utilize a transformation portion of its rules. This transformation portion may include additional and/or specific rules regarding the context or environment specified in the search query. The data hyper objects, such as data hyper object 29, may be used to request hyper object data and receive the requested hyper object data from the database 36 via the adapter 34. Upon receiving and manipulating the requested hyper object data using its rules, the data hyper object 29 may then appear as a pseudo object, such as pseudo object 38, to the HOQL engine 12 and provide a standardized output, such as a report, to the presentation unit 23 via the engine 12.

An example of a context transformation may be initiated by a query, such as the following: "What word corresponds to the number '1' in context of English?" The number '1' may correspond to a number of different words, such as "one", "uno", "ichi", "eins", etc., depending on the language context. In this example, the word "one" may be utilized in the search of the database.

Considering now a context age example, assume the heart rate of a patient is required to be analyzed. The analysis requires the patient's age as a factor in the analysis. In order to determine whether or not a heart rate for a given patient is normal, a context object such as the context hyper object 27 in response to the RETRIEVE signal such a medical analysis retrieval signal regarding a given patient, from the HOQL engine 12, sends a REQUEST CONTEXT DATA signal to the native database 36 via the adapter 34. As a result, a CONTEXT DATA signal such as the age of the patient being two days old, is retrieved from the database 36 via the adapter 34 and provided to the context hyper object 27, which then provides a TRANSFORM signal to the data hyper object 38.

The TRANSFORM signal may then provide context information to the data hyper object 38 to transform its rules to identify the given patient as being a neonate. In this manner, the data hyper object 38 has its rule transformed in such a manner that neonate normal heart rate data information is utilized instead of heart rate information such, for example, as adult heart rate information.

Some context transformations may be accomplished by a data hyper object without the use of a context hyper object, such that a context rule may be embedded in the rules of the data hyper object.

The presentation unit 23 may allow customization of the standardized report for each user. For example, a header including the company's name or other information desired by the user may be added to the report or other desired output.

The database 36 may be a relational database and include one or more databases that require one or more adapters such as the adapter 34. The adapters may be customized for each of the native databases to avoid the need to modify the other components of the system.

The adapters such as the adapter 34 may provide an interface to allow access to the database 36, so that the adapter may be the only component that needs to be modified in order for the system to operate with different databases. Each adapter may match native databases to common rule sets for different raw data. For example, for databases having the colors red, green, and blue, in a first context red may equal 1, green may equal 2, and blue may equal 3. In a second context, red may equal 3, green may equal 1, and blue may equal 2. Therefore, the adapter may provide, if required, the proper translation, depending on the context of the query. The adapters may abstract the different data structures and abstract them as to a standard output.

The HOQL may be implemented in a manner similar to Structured Query Language (SQL) used for relational database queries and may use extensions for specific applications. The syntax for HOQL may be substantially the same or similar to the syntax for SQL, but the actions may be different, such as instructing a first hyper object to command a second hyper object to utilize a transformation portion of its rules in response to a context condition of the query.

The standardized database access system 10 may include both management and data access functions. The management functions may include the ability to create, delete, describe, and list hyper objects. The data access functions may include the ability to retrieve, store, and update data from the database 36.

Referring now to FIG. 4, a standardized database access method using the system 10 of FIG. 1 in accordance with an embodiment of the invention is shown and generally referenced as 100. At step 102 a search query inputted by a user using the HOQL console 14 or the computer 16 executing the appropriate API may be received. The query may be for a search, which may be a Boolean search, a natural language search, or other appropriate search.

From this received search query a HOQL query may be generated and provided to the HOQL engine 12 as shown at step 104. At step 106 the HOQL query may include a selection of one or more hyper objects in the hyper object library and instructions on their combination, if necessary. As shown in step 108, the hyper objects may then each send a data request to the database. From this data request to the database, the hyper object may then receive the requested data at step 110. After the requested data is received at the hyper object, the data may be manipulated to create a desired output such as a report or other desired document at step 112. The desired standardized output may include adding specific user information or formatting to the report or document. At step 114 the desired output may be provided to the user at a display on a screen and/or as a printed document, or other.

If both a context hyper object and a data hyper object are selected, the context hyper object may send its context data request to the database prior to the data hyper object sending its hyper object data request to the database. When the context hyper object receives the requested context data from the database, the requested context data may then be manipulated to determine whether or not a transformation portion of the rules of one or more of the data hyper objects should be used in response to the HOQL query. If it is determined that a transformation portion of the rules of one or more of the data hyper objects should be used, a transform command may be sent to the appropriate data hyper objects. A data hyper object that receives the transform command may utilize the desired transformation portion of its rules in response to the transform command and to the query. The data hyper object may then use this transformation portion of its rules to send its hyper object data request to the database and to manipulate the requested hyper object data.

If during the generation of the HOQL query, it is determined that the available hyper objects in the hyper object library 25 are not adequate to respond to the search query from the user, or for any other reason that one or more new hyper objects would be desirable, the HOQL query may instruct the creation of a new hyper object, such as hyper object 41 (FIG. 3). This created hyper object 41 may then be utilized alone or in combination with other hyper objects to respond to the search query or other query as described above regarding FIG. 1. If it is determined that this created hyper object 41 may be useful for subsequent searches, it may be stored in the hyper object library 25 and become available for use by subsequent HOQL queries. It should be noted that the hyper object 41 may be deleted.

Therefore, it will become apparent to those skilled in the art that the computer arrangement and method of the present invention enables an algorithm or rule to learn and to adapt based upon individual experience and thus be automatically corrected over time dynamically. Similarly, retrieved data is monitored, and if determined to be invalid, is updated. This allows for scaling up the computer arrangement. As new information is stored, it is tested each time the algorithm or rule is executed to determine if it or its retrieved data is valid or not. Thus, dynamic self correction occurs, only when required. Such a technique may be employed in a single stand alone computer, or as described herein, may be employed advantageously in a group of networked computer systems.

Although the invention has been described with reference to the above examples, it will be understood that many modifications and variations are contemplated within the true spirit and scope of the embodiments of the invention as disclosed herein. Many modifications and other embodiments of the invention set forth herein will come to mind to one skilled in the art to which the invention pertains having the benefit of the teachings presented in the foregoing descriptions and the associated drawings. Therefore, it is to be understood that the invention shall not be limited to the specific embodiments disclosed and that modifications and other embodiments are intended and contemplated to be included within the scope of the appended claims. Although specific terms are employed herein, they are used in a generic and descriptive sense only and not for purposes of limitation.

What is claimed is:

1. A method for operating a computer system for a scalable network of computers to interact with certain information stored in a group of networked databases, at least some of which having different schema, comprising:
    providing for each one of the computers in the scalable network a similar network member computer system having a standardized database access system storing a group of standardized algorithms to enable data to be accessed in a standardized manner from the group of networked databases;
    analyzing validity of given data accessed by a given one of the algorithms in a given standardized data access systems by using a rule validity management module and a data management module in a given network member computer systems;
    the analyzing including comparing the given data accessed with the given algorithm by the rule validity management module to determine if the given algorithm is invalid;
    in response to the given algorithm is determined to be invalid by the rule validity management module in the given network member computer system, updating the given algorithm to thereby correct the invalidity of the given algorithm;
    the analyzing including determining the given data accessed to be inconsistent with the given algorithm by the data validity management module to determine if the given data accessed is invalid;
    in response to the given data accessed determined to be invalid by the data validity management module in the given network member computer systems, updating the given data to thereby correct the invalidity of the given algorithm; and
    whereby self-corrections occur dynamically over time with changing stored information.

2. The method according to claim 1, further including providing update information for updating corresponding other algorithms or data in other computers in the scalable network.

3. The method according to claim 1, further including updating both the given algorithm and given data accessed in other computers in the scalable network.

4. The method according to claim 1, wherein the given algorithm is updated by adjusting its attributes.

5. The method according to claim 1, further including subsequently determining the updated algorithm no longer provides valid data, and then repeating the algorithm updating.

6. The method according to claim 1, further comprising:
    storing the group of standardized algorithms in hyper objects;
    sending a hyper object query to a hyper object query language (HOQL) engine of the given standardized access system for, in turn, generating an HOQL query;

selecting at least one data identification information key hyper object from a hyper object library in response to the HOQL query from the HOQL engine;

sending a request for desired data via the at least one selected data identification key hyper object to interact with identification information of the desired data stored in the group of networked databases via their respective adapters; and using the requested data according to an algorithm associated with the selected data identification key hyper object to provide a desired standardized output in a form of a unique updated desired identifier for the given standardized access system to assist in retrieving of the desired data from the group of networked databases.

7. The method according to claim 1, wherein the standardized algorithms are rules embedded in hyper objects in the computers of the scalable network, and the hyper objects include at least one data hyper object and at least one context hyper object, the context hyper object retrieving context data from the group of networked databases to provide a transform command to be used by a transform portion of a selected data hyper object.

8. The method according to claim 1, further including adapting a data request to conform to a given database structure.

9. The method according to claim 1, further including storing the standardized algorithms in hyper objects, and creating a new hyper object in response to a query.

10. The method according to claim 1, wherein desired standardized outputs are generated.

11. The method according to claim 9, further including customizing the outputs using a presentation unit.

12. The method according to claim 1, wherein the standardized algorithms are rules embedded in hyper objects and further including updating the hyper objects.

13. A database access computer system for accessing data from a database, comprising:

a hyper object library storing a group of hyper objects, at least some of the hyper objects each containing a different algorithm in a form of at least one embedded rule;

the hyper objects including a plurality of data hyper object objects and a plurality of context hyper objects;

a hyper object query language (HOQL) engine for receiving a HOQL query;

the HOQL engine for selecting at least one of the plurality of data hyper objects and at least one of the plurality of context hyper objects in response to the HOQL query;

an adapter coupled to the database for communicating between the hyper objects and the database;

the selected at least one context hyper object for requesting context data from the database via the adapter;

the selected at least one context hyper object responsive to the requested context data for generating a rule transform command to be used by a transform portion of the selected data hyper object for transforming at least one embedded rule of the selected data hyper object;

the selected at least one data hyper object for sending data requests in accordance with the at least one transformed embedded rules to retrieve data from the database via the adapter;

the selected at least one data hyper object for receiving data corresponding to the data requests from the database via the adapter to be used by the at least one selected data hyper object according to the at least one transformed embedded rules associated with the at least one selected data hyper objects to provide desired standardized outputs;

wherein the adapter sends the data requests via the at least one selected data hyper objects to retrieve the requested data from the database; and wherein the adapter receives the requested data from the database to be used by the at least one selected data hyper object.

14. The system according to claim 13, further including:

a presentation unit for using the requested data according to an embedded rule associated with the selected data hyper object to provide the desired standardized outputs.

15. The system according to claim 13, wherein the plurality of context hyper objects retrieving the context data from the database to provide the rule transform command to be used by the transform portion of the at least one selected data hyper object.

16. The system according to claim 13, further including the HOQL engine for creating a new hyper object in response to the HOQL query.

17. The system according to claim 14, wherein the desired standardized outputs comprise a report, and wherein the presentation unit customizes the report.

18. A method for operating a scalable computer system to interact with certain information stored in a database, comprising:

providing at least one given algorithm stored in the scalable computer system to interact with given data accessed by the given algorithm;

analyzing the validity of the given algorithm, by providing at least one rule validity management module and at least one data management module;

if the given algorithm is determined by the rule module to be invalid, updating the given algorithm to thereby cause the invalidity of the given algorithm to be corrected;

the analyzing including determining the given data accessed to be inconsistent with the given algorithm by the data validity management module to determine if the given data accessed is invalid;

if the given data accessed is determined to be invalid by the data validity management module in the scalable computer system, updating the given data accessed to thereby correct the invalidity of the given algorithm; and whereby self-corrections occur dynamically over time with changing stored information.

19. The method according to claim 18, wherein each one of the at least one given algorithm is updated by adjusting its attributes.

20. The method according to claim 18, wherein each one of the at least one algorithm is a rule embedded in an object.

* * * * *

UNITED STATES PATENT AND TRADEMARK OFFICE
CERTIFICATE OF CORRECTION

PATENT NO. : 8,386,442 B2  
APPLICATION NO. : 13/469043  
DATED : February 26, 2013  
INVENTOR(S) : Chris A. Haudenschild et al.

Page 1 of 1

It is certified that error appears in the above-identified patent and that said Letters Patent is hereby corrected as shown below:

In the Claims:

Column 16, in Claim 1, lines 25-26, please delete "systems" and insert -- system --  
Column 16, in Claim 1, line 28, please delete "systems" and insert -- system --  
Column 16, in Claim 1, line 33, please delete "is"  
Column 16, in Claim 1, line 44, please delete "systems" and insert -- system --

Column 17, in Claim 13, line 41, please delete "object"  
Column 18, in Claim 13, line 5, please delete "rules" and insert -- rule --  
Column 18, in Claim 13, line 6, please delete "objects" and insert -- object --

Signed and Sealed this  
Sixteenth Day of April, 2013

Teresa Stanek Rea  
*Acting Director of the United States Patent and Trademark Office*